Figure 1:
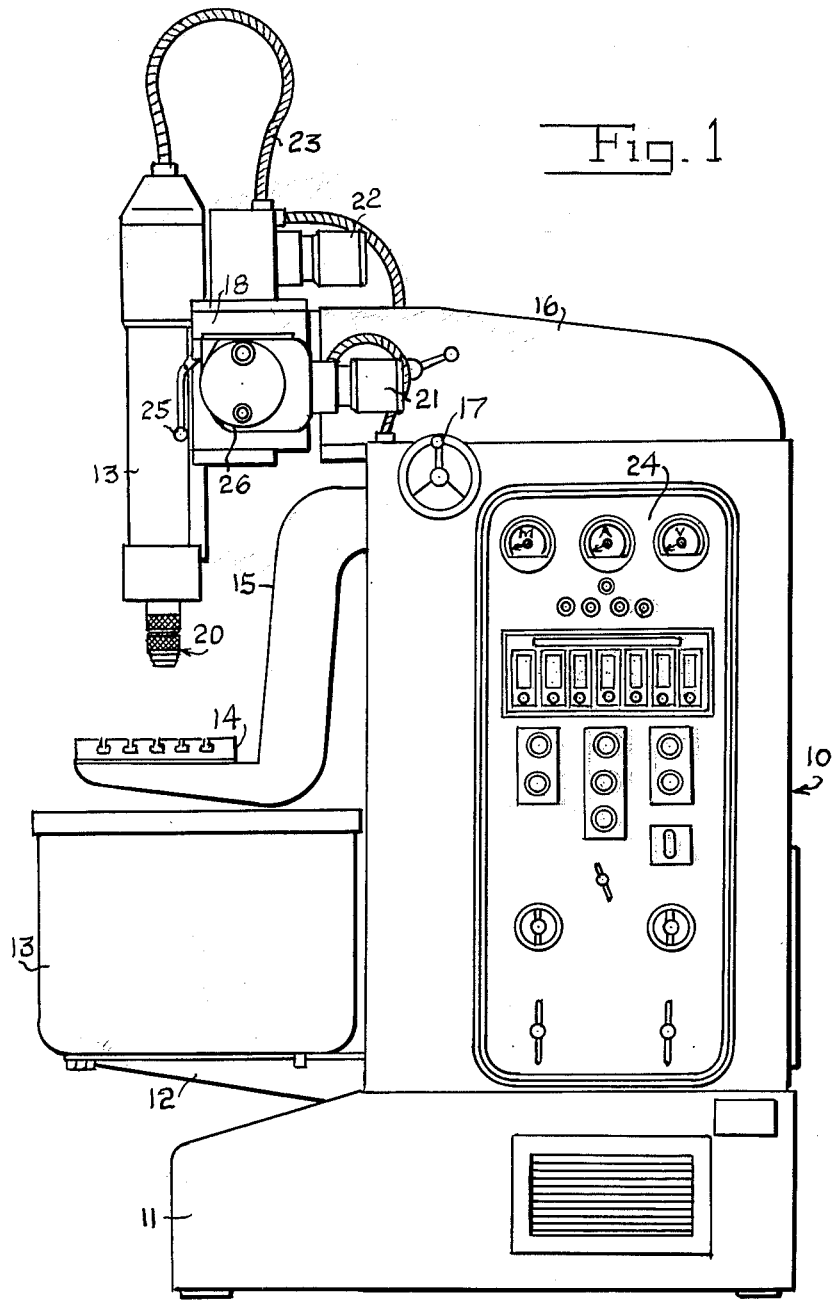

June 4, 1963

G. M. KIRILTSEV ETAL 3,092,710

ELECTRO-SPARK (SPARK-EROSION) APPARATUS
FOR PRECISION MACHINING OF METALS

Filed Oct. 5, 1960

3 Sheets-Sheet 2

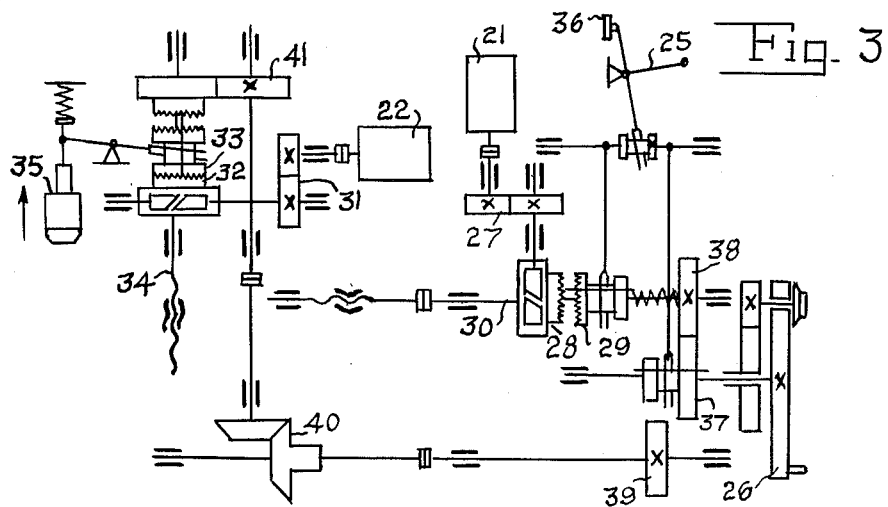
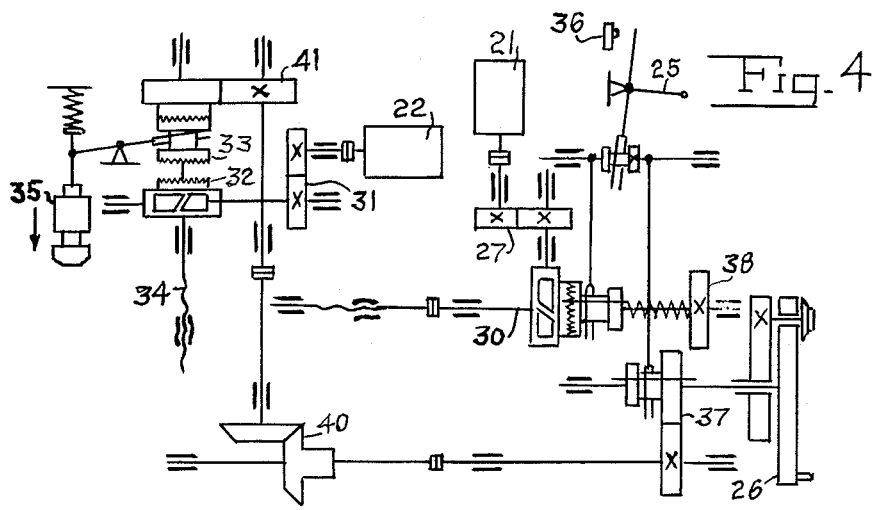

United States Patent Office 3,092,710
Patented June 4, 1963

3,092,710
ELECTRO-SPARK (SPARK-EROSION) APPARATUS FOR PRECISION MACHINING OF METALS
George Makarovich Kiriltsev, 1st Basmanny per. 5/20, Apt. 156, and Natalia Ioasafovna Lazarenko, Kotelnicheskaia naberezhnaia 1/15, korp. B, Apt. 70, both of Moscow, Union of Soviet Socialist Republics
Filed Oct. 5, 1960, Ser. No. 60,603
4 Claims. (Cl. 219—69)

This invention relates to machine tools and more particularly to an apparatus for the machining of metals by the use of an electrical discharge.

With the development of extremely hard alloys, such as tungsten, sintered and cemented carbides and the like, it became necessary to develop new types of machining apparatus since these alloys could not be machined with ordinary tools and for a considerable time the only tools suitable for this purpose were those provided with diamond tips which, of course, rendered the machining operation costly, complex and time consuming. As a result of this difficulty, a relatively new method of machining such materials has been developed which involves the use of electrical discharges in which there is no actual physical contact between a cutting tool and the work, the cutting tool in reality being merely an electrode which may be composed of any ductile electrical conductive materials, such as brass or the like, which consequently, may be conveniently and economically manufactured and this type of apparatus has provided a relatively high degree of machining accuracy when operating on alloys of the type mentioned above.

Prior apparatus utilizing this method of machining by electrical discharges has proven relatively satisfactory, particularly when compared with prior machining operations on alloys of this type and the present invention employs the same general type of machining apparatus and method, but operates to materially increase the versatility of such machine tools, in that the number of different types of machining operations which it is possible to perform are increased, thus making possible the use of one machine for a large variety of machining operations.

It is accordingly an object of the invention to provide an electrical discharge apparatus for the machining of metals in which the movements of the tools electrode with respect to the work may be automatically or manually controlled in accordance with the particular machining operation being carried out.

A further object of the invention is the provision of an electrical discharge apparatus for the machining of metals, which apparatus incorporates a tool electrode movable in three directions with respect to the work and in which such movement may be automatically controlled in accordance with the electrical energy supplied to the tool electrode.

A still further object of the invention is the provision of an electrical discharge apparatus for the machining of metals incorporating both a high voltage relaxation type pulse generator and a low voltage pulse generator, together with switch means for connecting one generator or the other to the tool electrode in order to perform different types of machining operations and on different types of materials.

Another object of the invention is the provision of an electrical discharge apparatus for the machining of metals incorporating a tool electrode, together with novel means for adjustably and releasably securing the electrode in place on the apparatus.

Figure 2:
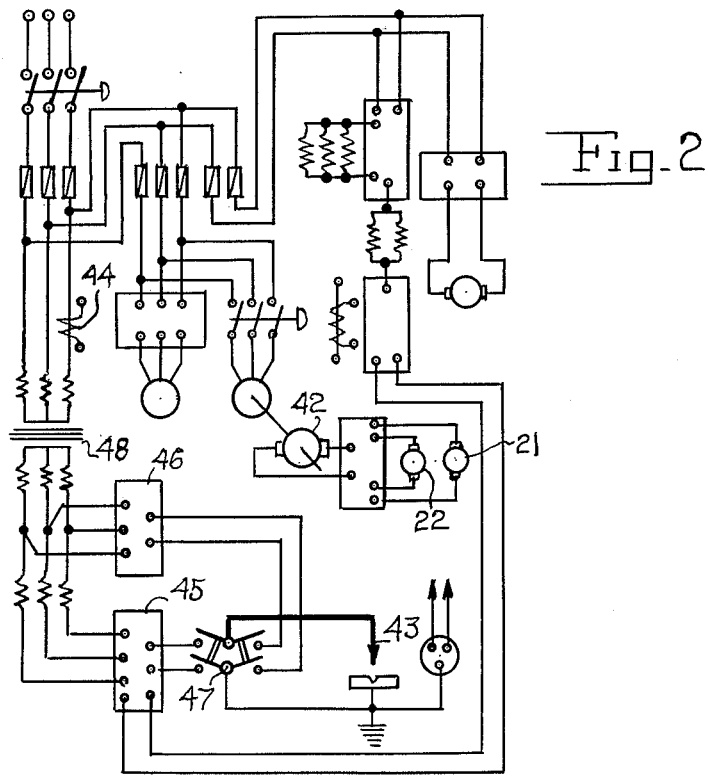
Figure 5:
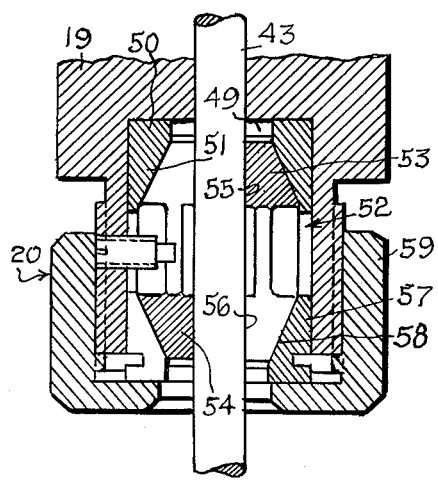

Further objects and advantages of the invention will be apparent from the following description taken in conjunction with the accompanying drawings wherein:

FIG. 1 is a side elevational view of an electrical discharge apparatus for the machining of metals constructed in accordance with this invention;

FIG. 2 a diagrammatic view showing the electrical circuit of the apparatus of this invention;

FIG. 3 a diagrammatic view showing the automatic and manual control means for moving the tool electrode relative to the work and in which vertical movement of the tool is automatic and horizontal movement of the tool is manual;

FIG. 4 a diagrammatic view similar to FIG. 3 and in which vertical movement of the tool is manual and horizontal movement thereof is automatic; and FIG. 5 a longitudinal sectional view showing the means for removably and adjustably securing a tool electrode in the tool holder of the apparatus.

With continued reference to the drawing, there is shown an electrical discharge apparatus for the machining of metals constructed in accordance with this invention and which may well include an upstanding frame 10 supported on a base 11 and mounted on suitable brackets 12 secured to the front of the upstanding frame 10 is a receptacle 13 open at the top and adapted to contain a suitable liquid bath. A work supporting table 14 carried by a bracket 15 is mounted on the frame 10 above the receptacle 13 and the table 14 may be moved into and out of the bath in the receptacle 13 by any suitable mechanism.

A horizontal arm 16 is slidably mounted on the upper end of the frame 10 for forward and rearward movement of the outer end of the arm 16 overhangs the table 14. Suitable manual means 17 is provided for moving the arm 16 forwardly or rearwardly.

A carriage 18 is slidably mounted on the forward end of the arm 16 for horizontal movement transversely thereof and a tool holder 19 is slidably mounted on the carriage 18 above the table 14 for vertical movement toward and away from the table 14. The tool holder 19 is provided with means 20 for removably securing a tool electrode to said holder and the structure of such securing means will be later described.

A motor 21 is provided for moving the carriage 18 and a motor 22 is provided for moving the tool holder 19. The tool electrode carried by the clamping means 20 may be supplied with electrical energy through a suitable cable or conducting means 23 which is connected to a suitable power supply contained in the frame 10 and mounted on the frame 10 is a control panel 24 having suitable switches and indicating instruments and a control lever 25 may be provided on the carriage 18 and the purpose and operation of such control lever 25 will be presently described. Also mounted on the carriage 18 is a manually operable handle 26 which may be selectively utilized to manually move the carriage 18 or the tool holder 19 and the operation of such handle 26 in conjunction with the motors 21 and 22 will be presently described.

With particular reference to FIG. 3, there is shown diagrammatically the feed mechanism for the carriage 18 and the tool holder 19 and as shown therein, the motor 21 is connected through suitable gearing 27 with one member 28 of a clutch which may be selectively coupled by the other member 29 of the clutch to a shaft 30 which operates to move the carriage 18. In a similar manner, the motor 22 is connected through gearing 31 with one member 32 of a clutch which may be coupled by the other member 33 of the clutch to a shaft 34 which operates to move the tool holder 19 vertically. The movable clutch member 33 is controlled by a solenoid 35 which in turn is controlled by a switch 36 operated by the control lever 25 and the clutch member 29 is mechanically controlled by operation of the control lever 25.

Manual operation for the shaft 30 and shaft 34 is provided by means of a shiftable gear 37 connected to the crank handle 26, the gear 37 being engageable with a gear 38 for driving the shaft 30 or being engageable with a gear 39 which in turn is connected through suitable gearing 40 and 41 for driving the shaft 34. As shown in FIG. 3, the clutch member 33 is in engagement with the clutch member 32 to provide for drive of the vertical shaft 34 of the tool holder 19 by the motor 22 while the clutch 29 is disengaged from the clutch member 28 to permit manual drive of the shaft 30 by means of the manual crank or control member 26.

As shown in FIG. 4, the control lever 25 has been operated to energize the solenoid 35 to disengage the clutch member 33 from the clutch member 32 thereby interrupting drive of the shaft 34 from the motor 22 and at the same time, movement of control lever 25 operates to engage the clutch member 29 with the clutch member 28 to provide for driving the shaft 30 from the motor 21 and at the same time, disengages the gear 37 from the gear 38 and engages the same with gear 39 to permit manual movement of the shaft 34 by the means of the manual crank 26.

With particular reference to FIG. 2 there is shown the wiring diagram for the apparatus of this invention and as shown therein, the motors 21 and 22 are operated and controlled from a pulse generator 42 which in turn may be energized, either from the tool electrode 43 or from the secondary winding 44 of a suitable transformer connected in the electrical supply circuit.

A high voltage relaxation type pulse generator 45 is provided and a low voltage pulse generator 46 devoid of capacitance is also provided, as well as a suitable switch 47 for selectively connecting either the high voltage generator 45 or the low voltage generator 46 to the tool electrode 43. The generators 45 and 46 may be supplied with power from a suitable transformer 48. The high voltage pulse generator 45 would operate at a voltage of the order of two hundred volts while the low voltage pulse generator 46 will operate at a voltage of the order of eighteen to twenty volts.

The high voltage relaxation type pulse generator 45 is primarily employed for the machining of irregularly shaped apertures, the machining of carbide alloys and the surface hardening of metals while ordinary cutting operations are normally performed by utilizing the low voltage pulse generator 46. Thus, selective operation of the apparatus is possible utilizing either of the pulse generators and furthermore, the feed motors 21 and 22 operated and controlled by the pulse generator 42 operate in response to energization of the spark gap or tool electrode 43.

With particular reference to FIG. 5 there is shown the details of the clamping means 20 for the tool electrode 43 and as shown therein, a recess 49 is provided in the lower end of the tool holder 19 and seated in the recess 49 is a bushing 50 having a tapered inner surface 51. A tool clamping collet 52 is provided with oppositely tapered ends 53 and 54 with the tapered end 53 engaging the tapered inner surface 51 of the bushing 50 and the collet 52 is provided with spaced surfaces 55 and 56 for engaging the tool electrode 43. A second bushing 57 provided with a tapered inner surface 58 is received in the recess 49 and the tapered end 54 of the collet 52 engages the tapered surface 58 of the bushing 57. The nut 59 is threadedly received on the lower end of the tool holder 19 and operation of the nut 59 operates to move the bushing 57 inwardly to also move the collet 22 inwardly and the action of the tapered ends 53 and 54 of the collet 52 in engagement with the tapered surfaces 51 and 58 of the bushings 50 and 57 operates to securely clamp the tool electrode 43 in any desired adjusted position or to permit convenient removal and replacement of such tool electrode.

It will be seen that by the above described invention there has been provided an apparatus for conveniently and accurately machining metals and particularly hard alloys by the use of an electrical discharge and in which the nature of such discharge may be conveniently varied for different types of machining operation and also an apparatus in which the feed of the tool electrode may be selectively manual or automatic and in accordance with the character of the spark or electrical discharge and furthermore, there has also been provided a relatively simple, yet highly effective means for releasably clamping the tool electrode in adjusted position.

It will be obvious to those skilled in the art that various changes may be made in the invention without departing from the spirit and scope thereof and therefore the invention is not limited by that which is shown in the drawings and described in the specification, but only as indicated in the appended claims.

We claim:

1. An electrical discharge apparatus for the machining of metal, said apparatus comprising an upstanding frame, a receptacle mounted on the lower part of said frame at the front, said receptacle being open at the top and adapted to contain a liquid bath, a work table mounted on said frame above said receptacle and movable into and out of the bath in said receptacle, a horizontal arm slidably mounted on the upper end of said frame for forward and rearward movement and overhanging said table, means to move said arm, a carriage slidably mounted on the forward end of said arm for horizontal movement transversely thereof, a tool holder slidably mounted on said carriage above said table for vertical movement toward and away from said table, means for removably securing a tool electrode to said tool holder, a first motor for moving said carriage, a second motor for moving said tool holder, common manual means for moving said carriage and said tool holder, clutch means for selectively coupling said first or second motor or said manual means for movement of said carriage and tool holder, a pulse generator for controlling the operation of said first and second motors, a high voltage relaxation type pulse generator, a low voltage pulse generator and means including a switch for selectively connecting said high voltage or low voltage generators to said tool electrode and said work table.

2. An apparatus as defined in claim 1, in which the pulse generator for controlling the operation of said first and second motors is controlled by electrical energy supplied to said tool electrode.

3. An apparatus as defined in claim 1, in which the pulse generator for controlling the operation of said first and second motors is controlled in response to energization of said high voltage or low voltage pulse generator.

4. An electrical discharge apparatus for the machining of metal, said apparatus comprising an upstanding frame, a work table mounted on said frame, a horizontal arm slidably mounted on the upper end of said frame for forward and rearward movement and overhanging said table, means to move said arm, a carriage slidably mounted on the forward end of said arm for horizontal movement transversely thereof, a tool holder slidably mounted on said carriage above said table for vertical movement toward and away from said table, means for removably securing a tool electrode to said tool holder, a first motor for moving said carriage, a second motor for moving said tool holder, common manual means for moving said carriage and said tool holder, clutch means for selectively coupling said first or second motor or said manual means for movement of said carriage and tool holder, a pulse generator for controlling the operation of said first and second motors, a high voltage relaxation type pulse generator, a low voltage pulse generator and means including a switch for selectively connecting said high voltage or low voltage generator to said tool holder and said work table.

References Cited in the file of this patent

UNITED STATES PATENTS

| | | |
|---|---|---|
| 2,773,968 | Martellotti et al. | Dec. 11, 1956 |
| 2,841,686 | Williams | July 1, 1958 |
| 2,951,930 | McKechnie | Sept. 6, 1960 |

FOREIGN PATENTS

| | | |
|---|---|---|
| 455,775 | Great Britain | Oct. 27, 1936 |